United States Patent
Pryne

(10) Patent No.: US 10,238,991 B2
(45) Date of Patent: Mar. 26, 2019

(54) CLEANOUT DEVICE AND METHOD

(71) Applicant: American Felt & Filter Company, New Windsor, NY (US)

(72) Inventor: Scott H. Pryne, New Windsor, NY (US)

(73) Assignee: AMERICAN FELT & FILTER COMPANY, New Windsor, NY (US)

(*) Notice: Subject to any disclaimer, the term of this patent is extended or adjusted under 35 U.S.C. 154(b) by 672 days.

(21) Appl. No.: 14/340,958

(22) Filed: Jul. 25, 2014

(65) Prior Publication Data
US 2016/0023130 A1 Jan. 28, 2016
US 2016/0206973 A9 Jul. 21, 2016

Related U.S. Application Data

(60) Provisional application No. 61/914,461, filed on Dec. 11, 2013.

(51) Int. Cl.
B01D 15/26 (2006.01)
C11C 5/00 (2006.01)
B01J 20/28 (2006.01)

(52) U.S. Cl.
CPC ...... *B01D 15/265* (2013.01); *B01J 20/28014* (2013.01); *B01J 20/28023* (2013.01); *C11C 5/00* (2013.01)

(58) Field of Classification Search
CPC . C11C 5/00; B01J 20/28023; B01J 20/28014; B01D 15/265
USPC .................................................. 431/292, 323
See application file for complete search history.

(56) References Cited

U.S. PATENT DOCUMENTS

| 2,413,964 | A | * | 1/1947 | Foster | A47L 13/16 139/420 R |
| 3,104,174 | A | * | 9/1963 | Harris | F16D 69/022 427/290 |
| 4,722,477 | A |   | 2/1988 | Floyd |  |
| 5,007,529 | A |   | 4/1991 | Spector |  |
| 5,840,246 | A | * | 11/1998 | Hammons | A61L 9/03 239/54 |
| 5,980,241 | A | * | 11/1999 | Schirneker | C11C 5/006 362/161 |
| 7,132,084 | B1 |   | 11/2006 | Roumpos |  |
| 7,713,488 | B2 |   | 5/2010 | Harris et al. |  |
| D678,496 | S |   | 3/2013 | Browder |  |
| 8,412,029 | B2 |   | 4/2013 | Browder et al. |  |
| 2003/0150467 | A1 |   | 8/2003 | Robinson |  |
| 2006/0102737 | A1 |   | 5/2006 | Harmon et al. |  |
| 2006/0283970 | A1 |   | 12/2006 | Faires et al. |  |
| 2007/0217771 | A1 | * | 9/2007 | Granger | A01M 1/2033 392/386 |
| 2008/0099576 | A1 |   | 5/2008 | Hart |  |
| 2008/0116197 | A1 |   | 5/2008 | Penman et al. |  |
| 2008/0130266 | A1 |   | 6/2008 | DeWitt et al. |  |
| 2008/0179424 | A1 |   | 7/2008 | Cheung |  |

(Continued)

*Primary Examiner* — Alfred Basichas
(74) *Attorney, Agent, or Firm* — Nixon & Vanderhye PC

(57) ABSTRACT

A device and method for removing hot molten wax or other material from a receptacle for a meltable tart or the like. The device has a heat resistant body formed of a material that is of sufficient porosity to absorb or soak up the hot molten wax or other material in the receptacle when it is positioned therein and to retain its structural integrity so that it can be disposed of after it has absorbed or soaked up the hot molten wax or other material.

5 Claims, 3 Drawing Sheets

(56) References Cited

U.S. PATENT DOCUMENTS

2009/0233251 A1\* 9/2009 Ambroggio ............ F21V 35/00
431/292
2012/0183280 A1 7/2012 Kowalec et al.

\* cited by examiner

CLEANOUT DEVICE AND METHOD

CROSS REFERENCE TO RELATED APPLICATIONS

The present application claims the priority of Provisional Patent Application No. 61/914,461 filed on Dec. 11, 2013.

BACKGROUND OF THE INVENTION

1. Field of the Invention

The present invention relates to a cleanout device and, more particularly, to such a device that can be positioned in hot molten material such as wax from a candle tart or the like so that it absorbs or soaks up the hot molten material and can then be disposed of.

2. Description of Prior Art

Various devices are currently used to emit scents in a surrounding area. For example, scented candles may be burned or candle tarts may be heated and melted to emit a scent. In the case of a candle, there is a safety hazard resulting from an open flame.

In the case of a meltable candle tart, it turns to liquid when heated and forms a pool that emits a fragrance. The pool is in the form of a hot liquid and thus may spill and result in a burn to the user or damage to a supporting surface. Additionally, it is a common practice to allow the hot liquid material such as wax from the candle tart to cool and thus harden in a container in which it is received. It is difficult and time consuming to attempt to remove the hardened wax or other material from the receptacle.

A need has arisen, therefore, for a new and improved device and method for removing and disposing of hot molten wax or other materials from a candle tart or the like. The cleanout device and method of the present invention meet this need.

BRIEF SUMMARY OF THE INVENTION

The cleanout device of the present invention may be of any suitable size or shape and is formed of any suitable heat-resistant material that will absorb or soak up hot molten wax or other materials. In the method of the present invention, the cleanout device is positioned in a receptacle of hot molten wax or other material from a candle tart or the like so that it absorbs or soaks up the hot molten material and can then be disposed of to facilitate the cleaning of the receptacle.

DETAILED DESCRIPTION OF THE INVENTION

Figure 1:
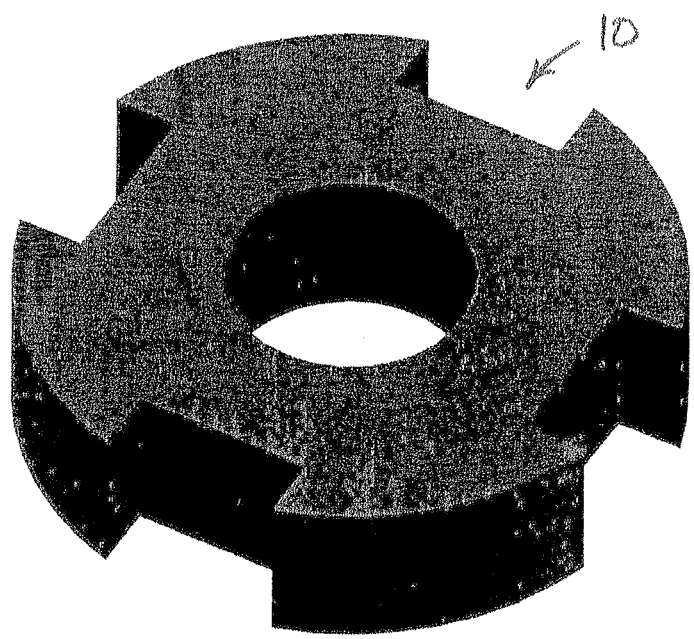
FIG. 1 is a perspective view of a first embodiment of the cleanout device of the present invention.
Figure 2:
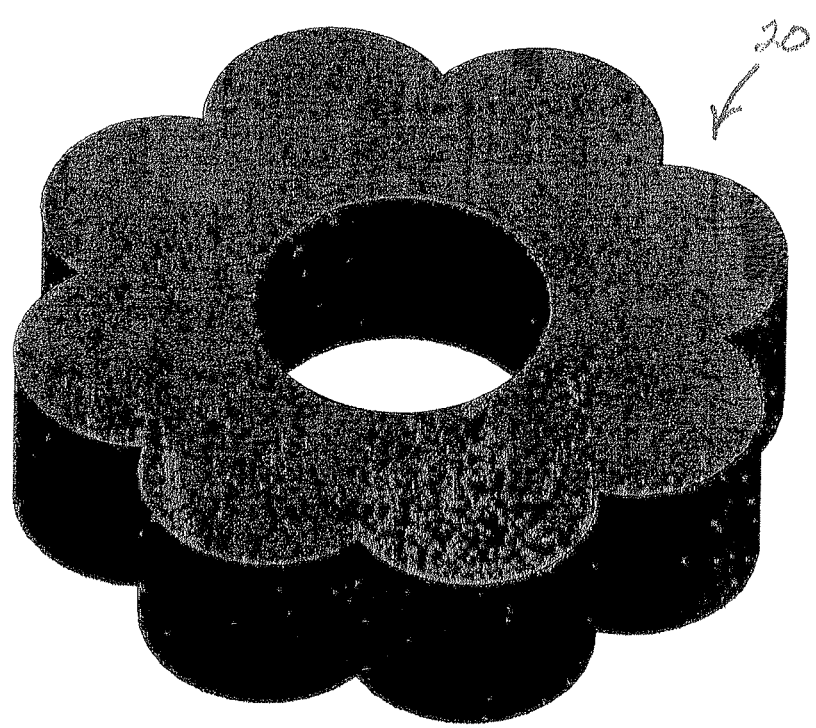
FIG. 2 is a perspective view of a second embodiment of the cleanout device of the present invention.
Figure 3:
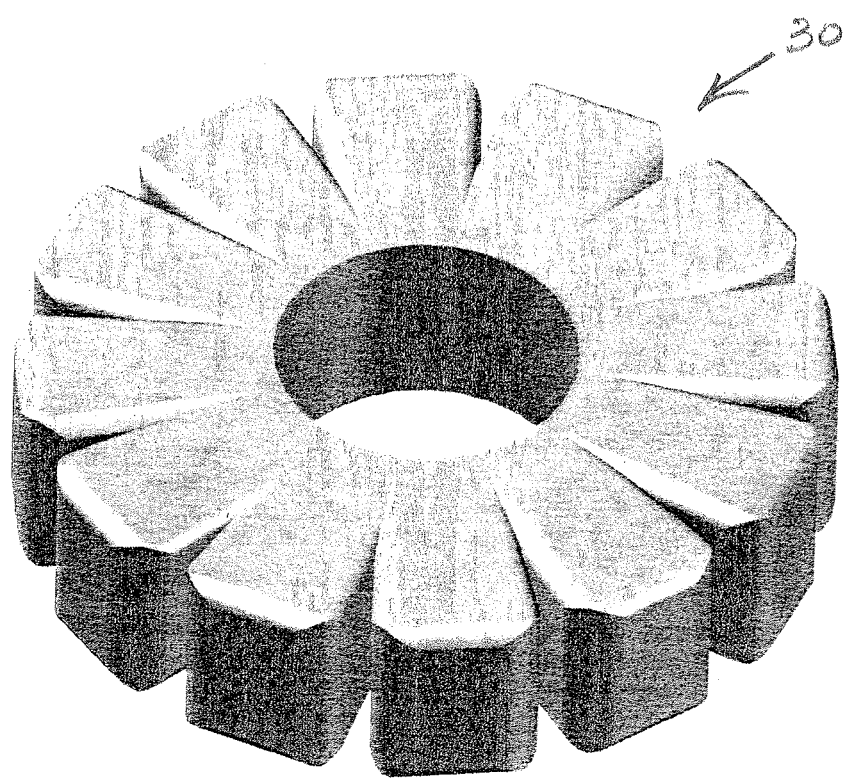
FIG. 3 is a perspective view of a third embodiment of the cleanout device of the present invention.

The cleanout device of the present invention may be of any suitable size or shape. Preferably, its shape includes a large amount of surface area for absorbing or soaking up hot molten material such as wax and can be in the shape of a wafer as shown at 10 in FIG. 1, at 20 in FIG. 2 and at 30 in FIG. 3.

The cleanout device of the present invention is formed of any suitable porous and heat resistant material that will absorb or soak up hot molten material such as wax and will maintain its structured integrity when heated. As illustrative examples, the cleanout device may be formed of any nonwoven, woven, meltblown, spunbond, sintered, thermo bonded, extruded or resin bonded material comprised of any natural or synthetic blend and varied deniers of fibers, or of any suitable capillary wicking material. The density can be adjusted so that its porosity will be suitable for complete pick up of a hot molten wax or other material in a receptacle or the like which receives hot molten material from a candle tart or the like.

In the method of the present invention, the cleanout device is positioned in hot molten wax or another material in a receptacle for a candle tart or the like. The cleanout device has sufficient porosity and heat resistance so that it absorbs or soaks up all of the hot molten material in the receptacle and can then be disposed of. In this manner, the hot molten material can be easily disposed of without exposing the user to burns from the material or any damage to a supporting surface if the hot material should spill. Also, it is not necessary to wait for the hot molten wax or other material to cool and harden which makes it very time consuming and difficult to remove the hardened wax or other material from the receptacle for the candle tart or the like.

As will be evident from the foregoing description, the cleanout device and method of the present invention are advantageous in removing hot molten wax or another material from a receptacle for a wax tart or the like for many reasons, some of which are as follows:

1. The cleanout device is simple in construction and is inexpensive to manufacture;
2. The cleanout device is easy to store, handle and use;
3. The cleanout device allows for the immediate removal of hot molten wax or other material from a receptacle and thus minimizes the chance of burns to a user or damage to a supporting surface if the hot molten wax or other material is spilled;
4. The cleanout device is reliable in operation and absorbs or soaks up the hot molten wax or other material in a receptacle without requiring a user to wait for the hot molten wax or other material to cool and harden before it can be removed from a receptacle which is time consuming and difficult;
5. The cleanout device can be manufactured with numerous surfaces to present a large surface area for the absorption of the hot molten wax or other material; and
6. The cleanout device can be easily disposed of after use.

While the invention has been described in connection with what is presently considered to be the most practical and preferred embodiments, it is to be understood that the invention is not to be limited to the disclosed embodiments but on the contrary, is intended to cover various embodiments and equivalent arrangements included within the spirit and scope of the appended claims.

The invention claimed is:

1. A method of removing hot molten wax from a receptacle for a wax tart or fuel holder, comprising:
    positioning in the receptacle having the hot molten wax therein a heat resistant cleanout wafer that is formed of a material that absorbs or soaks up the hot molten wax in the receptacle, and
    removing the clean out wafer from the receptacle after the clean out wafer has absorbed or soaked up the hot molten wax in the receptacle.

2. The method of claim 1 wherein the cleanout wafer has a body of a size, shape and surface area sufficient to absorb or soak up all of the hot molten wax in the receptacle.

3. The method of claim 2 wherein the body is formed of a material selected from the group comprising nonwoven, woven, meltblown, spunbond, sintered, thermo bonded, extruded or resin bonded material.

4. The method of claim 3 wherein the material is comprised of a natural or synthetic blend and varied denier of fibers.

5. The method of claim 2 wherein the wafer maintains structural integrity when positioned in the hot molten wax.

\* \* \* \* \*